(12) United States Patent
Ruth et al.

(10) Patent No.: US 6,605,382 B2
(45) Date of Patent: Aug. 12, 2003

(54) LITHIUM ION BATTERY SUITABLE FOR HYBRID ELECTRIC VEHICLES

(75) Inventors: Alan Ruth, Orem, UT (US); Andy Szyszkowski, Canyon Country, CA (US); Clay Kishiyama, Valencia, CA (US); Hiroyuki Yumoto, Stevenson Ranch, CA (US); Hisashi Tsukamoto, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 118 days.

(21) Appl. No.: 09/842,790

(22) Filed: Apr. 25, 2001

(65) Prior Publication Data

US 2001/0053476 A1 Dec. 20, 2001

Related U.S. Application Data

(60) Provisional application No. 60/199,893, filed on Apr. 26, 2000.

(51) Int. Cl.[7] .............................. H01M 2/26; H01M 2/08
(52) U.S. Cl. ........................ 429/94; 429/178; 429/174; 429/161; 429/211
(58) Field of Search ........................... 429/94, 174, 211, 429/161, 178

(56) References Cited

U.S. PATENT DOCUMENTS

| 6,040,086 A | 3/2000 | Yoshida et al. |
| 6,139,986 A | 10/2000 | Kurokawa et al. |
| 6,197,074 B1 | 3/2001 | Satou et al. |
| 6,245,457 B1 | 6/2001 | Romero |
| 6,258,485 B1 | 7/2001 | Kitoh |
| 6,319,628 B1 | 11/2001 | Zama |
| 6,379,840 B2 | 4/2002 | Kitoh et al. |
| 2002/0142216 A1 | 10/2002 | Skoumpris |

FOREIGN PATENT DOCUMENTS

| EP | 1 246 275 A2 | 10/2002 |
| JP | 11-224660 A | 8/1999 |
| JP | 11-250934 A2 | 9/1999 |
| JP | 2000311666 A2 | 11/2000 |
| JP | 2000323105 A2 | 11/2000 |
| JP | 2001052759 A2 | 2/2001 |
| JP | 2001297745 A | 10/2001 |
| WO | WO 01/82397 A1 | 11/2001 |

OTHER PUBLICATIONS

Article 34 Amendment as filed on Oct. 9, 2001 in relation to Application No. PCT/US01/13398.
Written Opinion, dated May 20, 2002, as received in relation to Application No. PCT/US01/13398.
Reply to Written Opinion as filed on Jun. 18, 2002 in relation to Application No. PCT/US01/13398.
International Preliminary Examination Report, dated Aug. 5, 2002, as received in relation to Application No. PCT/US01/13398.

*Primary Examiner*—John S. Maples
(74) *Attorney, Agent, or Firm*—M. Elizabeth Bush; Freilich, Hornbaker & Rosen

(57) ABSTRACT

A lithium ion battery configured to yield a high energy density output by minimizing head space, i.e., wasted interior volume, within the battery case and/or by reducing electrical energy losses internal to the battery.

6 Claims, 5 Drawing Sheets

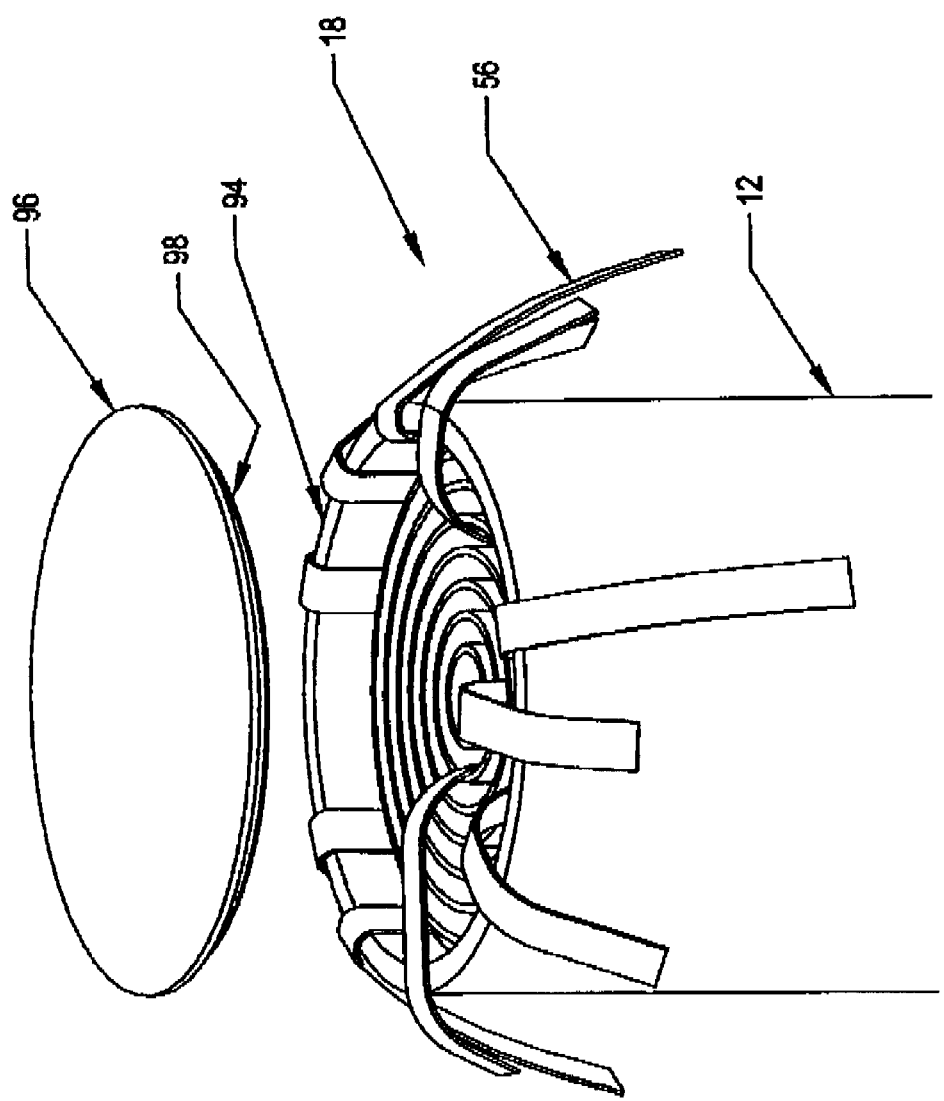

LITHIUM ION BATTERY SUITABLE FOR HYBRID ELECTRIC VEHICLES

RELATED APPLICATIONS

This application claims the benefit of U.S. Provisional Application 60/199,893 filed Apr. 26, 2000.

FIELD OF THE INVENTION

This invention relates to a lithium ion battery construction for producing a high energy density output.

BACKGROUND OF THE INVENTION

Various applications, such as in hybrid electric vehicles (HEV), require batteries exhibiting a high energy density output. "Energy density" refers to the ratio of the energy available from a battery to the weight or volume of the battery.

SUMMARY OF THE INVENTION

The present invention is directed to a lithium ion battery, and fabrication method therefor, configured to yield a high energy density output by minimizing head space, i.e., wasted interior volume, within the battery case and/or by reducing electrical energy losses internal to the battery.

A battery in accordance with the present invention includes a metal case comprised of a thin peripheral wall, e.g., cylindrical, surrounding an interior volume. In accordance with a preferred embodiment, the interior volume is substantially fully occupied by an electrode assembly comprised of a positive electrode strip, a negative electrode strip, and separator strips, superimposed on one another and helically wound to form a so called "jelly roll". The positive electrode strip is formed of a metal substrate or foil, e.g., aluminum, having positive active material formed on both faces thereof. The negative electrode strip is formed of a metal substrate or foil, e.g., copper, having negative active material formed on both faces thereof.

In accordance with the invention, a set of multiple negative tabs extend from spaced locations along the negative electrode substrate toward the upper end of the case peripheral wall. A set of multiple positive spaced tabs extend from the positive electrode substrate toward the lower end of the case peripheral wall.

In accordance with a preferred embodiment of the invention, the negative tabs are electrically connected to a current collector, i.e., a metal ring, mounted within the interior volume adjacent to the upper end of the case peripheral wall. The metal ring is insulated from the peripheral wall, preferably by a concentric dielectric ring.

In further accordance with the preferred embodiment, the positive tabs are electrically connected to the peripheral wall by first folding them over the lower wall edge. A conductive end cap is mounted against the peripheral wall lower edge to pinch and electrically connect the positive tabs therebetween. The end cap is then sealed to the case peripheral wall, e.g., by laser welding, to completely seal the battery lower end and electrically connect the positive tabs to the case peripheral wall.

BRIEF DESCRIPTION OF THE DRAWINGS

FIG. 6 is an isometric view showing the lower end of the battery having multiple tabs extending from the jelly roll and folding over the peripheral wall bottom edge for capture by an end cap which is then sealed to the peripheral wall bottom edge.

DETAILED DESCRIPTION

The following text describes a presently contemplated preferred embodiment for practicing the invention. The description of the preferred embodiment should not be interpreted as a limitation on the scope of the invention which is defined by the accompanying claims.

Figure 1:
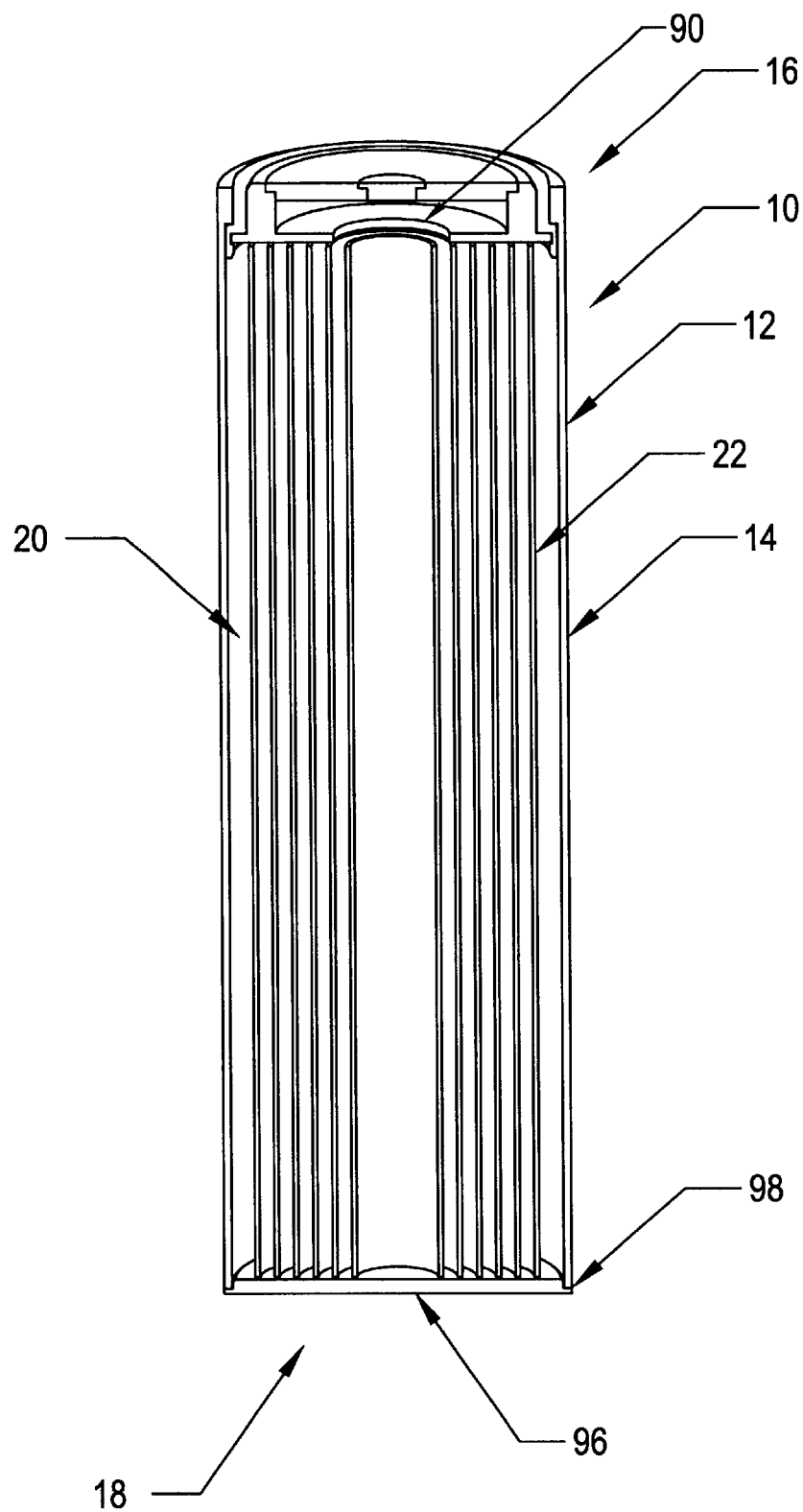
FIG. 1 comprises a cutaway side view of a battery in accordance with the present invention.

FIG. 1 illustrates the preferred construction of a battery in accordance with the present invention for producing a high energy density output. The battery is comprised of a case 12 including a peripheral wall 14 formed of a thin sheet of metal, e.g., aluminum. The peripheral metal wall 14 preferably, but not necessarily, forms a cylindrical tube, having an open upper end 16 and open lower end 18. The peripheral wall 14 defines an interior volume 20 which is to be essentially fully occupied by an electrode assembly 22, preferably configured as a so called "jelly roll", in accordance with the assembly procedure to be described hereinafter.

The jelly roll assembly 22 is comprised of a negative electrode strip, a positive electrode strip, and separator strips, superimposed and helically wound together. More particularly, attention is directed to FIG. 2 which illustrates a cross sectional portion of the jelly roll assembly 22. It can be seen that the assembly is comprised of a first polarity (e.g., negative) electrode strip 30, a second polarity (e.g., positive) electrode strip 32 and separator strips 34. The negative electrode strip 30 is comprised of an elongate metal substrate 40, e.g., copperfoil, having negative active material 42 deposited on both faces of the foil substrate 40. Similarly, the positive electrode strip 32 is comprised of an elongate metal substrate 44, e.g., aluminum foil, having positive active material 46 deposited on both faces thereof. Dielectric separator strips, e.g., polyethylene, separate adjacent electrode strip layers.

Figure 2:
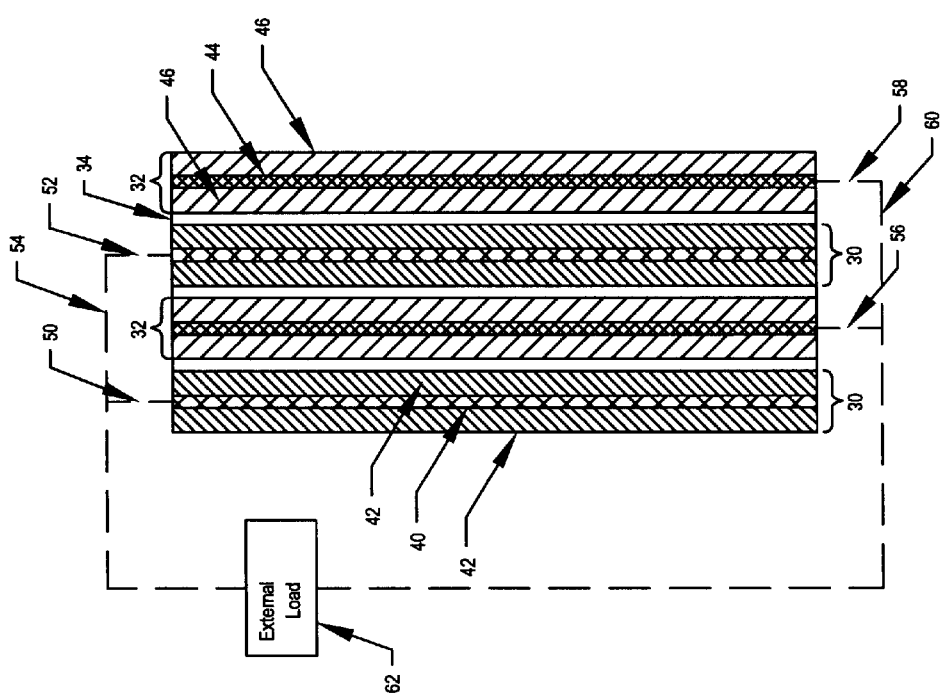
FIG. 2 comprises an enlarged sectional view depicting multiple layers of an electrode assembly or "jelly roll" contained within the battery case of FIG. 1.

Jelly roll assemblies as thus far described are well known in the art, as are suitable positive and negative active materials and substrates. The present invention is directed to a preferred construction for maximizing the energy density output from a battery utilizing a jelly roll assembly of known materials. In accordance with a first aspect of the invention, as schematically represented in FIG. 2, multiple positive and negative tabs extend in opposite directions from the electrode strip substrates and are respectively electrically connected to the case and a negative end cap. For example, note that FIG. 2 depicts tabs 50 and 52 extending upwardly from the negative substrate 40 and connected together by a current collector 54. Similarly, FIG. 2 schematically depicts multiple tabs 56 and 58 extending downwardly from positive electrode substrate 44 for connection to a current collector 60. The respective current collectors 54 and 60 can be externally connected to provide power to a load represented at 62.

Figure 3:
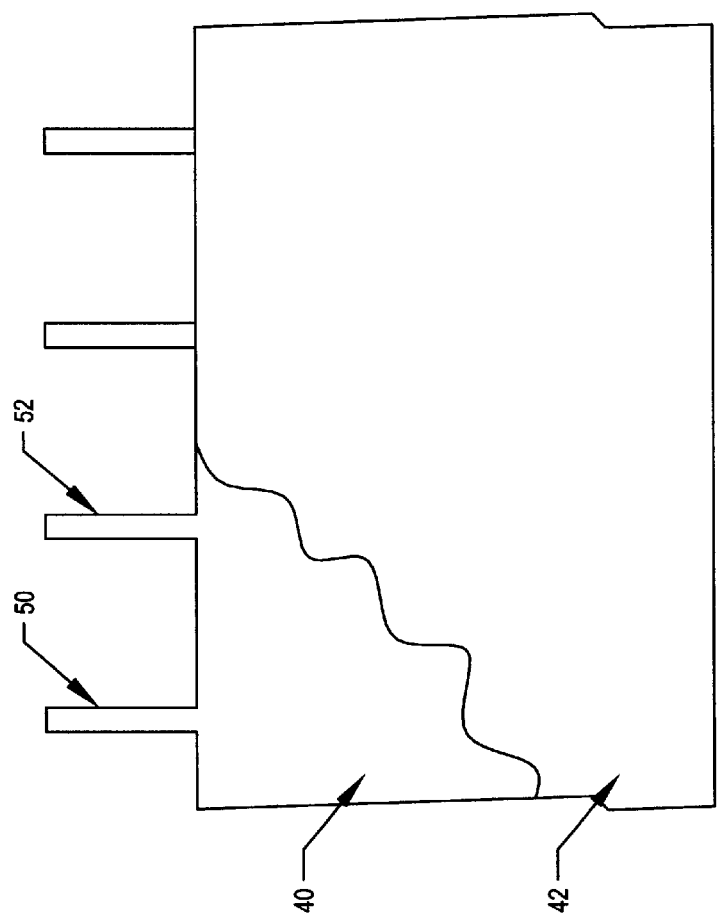
FIG. 3 depicts a portion of an electrode strip employed in the jelly roll of FIG. 2 showing the electrode substrate, the active material thereon, and multiple tabs extending outward from the substrate.

Attention is now directed to FIG. 3 which illustrates a portion of an electrode strip in accordance with the invention for use in the jelly roll assembly 22. The electrode strip of FIG. 3 is depicted as comprising a negative metal substrate 40 having spaced multiple tabs 50, 52 etc electrically connected thereto and extending outwardly therefrom. The tabs can be formed integral with the elongate metal foil forming the substrate 40 or can be separate metal members connected to the foil 40 as by welding. FIG. 3 also depicts the negative active material 42 affixed to the face of the substrate 40. The positive electrode strip is constructed similarly to the negative electrode strip illustrated in FIG. 3 except that its tabs 56, 58 extend in a direction opposite to the direction of tabs 50 and 52.

Figure 4:
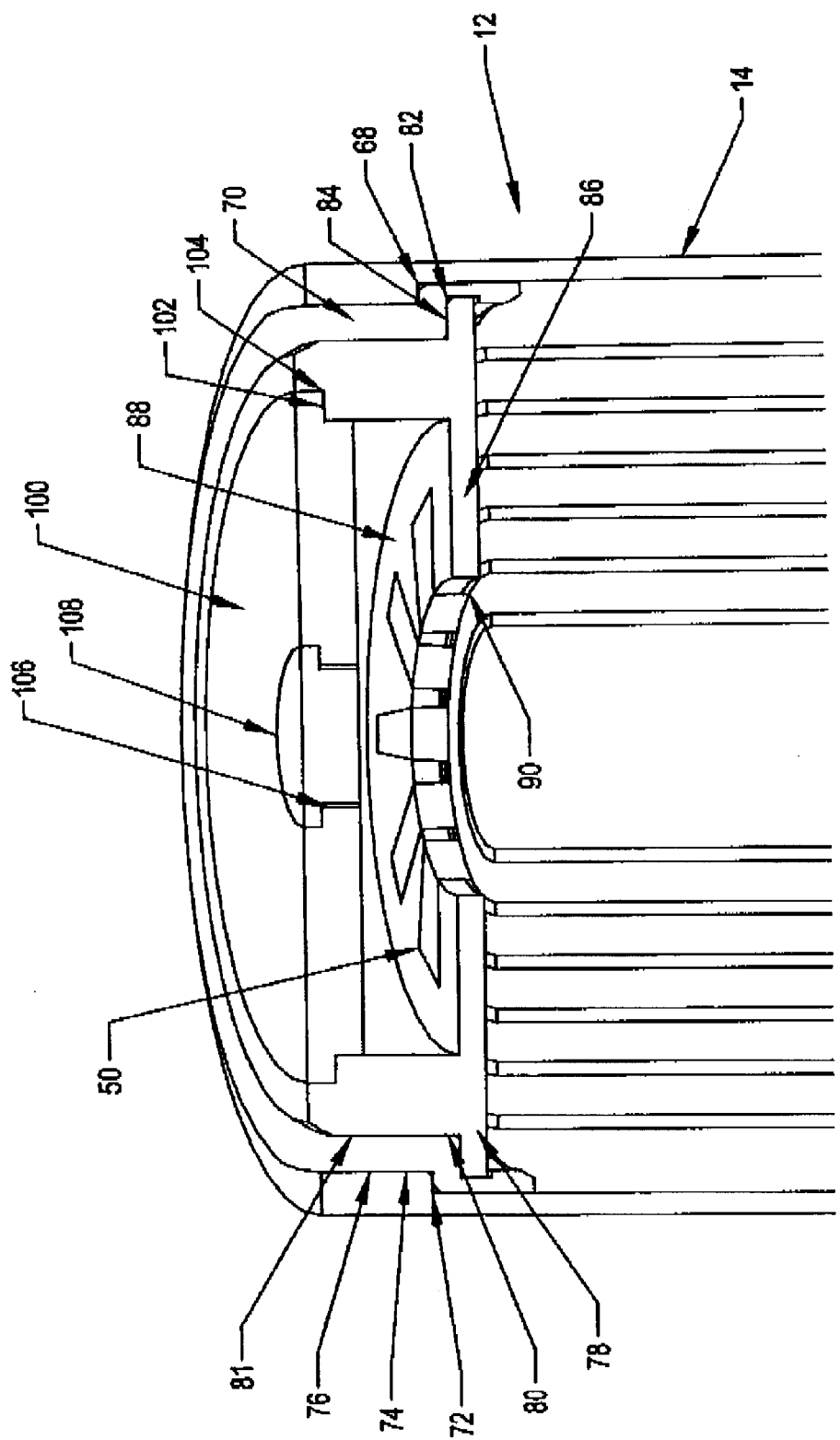
FIG. 4 is an enlarged cutaway side view of the upper end of the battery of FIG. 1 showing multiple tabs extending from the jelly roll assembly and electrically connected to a metal ring insulated from the battery case peripheral wall by a dielectric ring.
Figure 5:
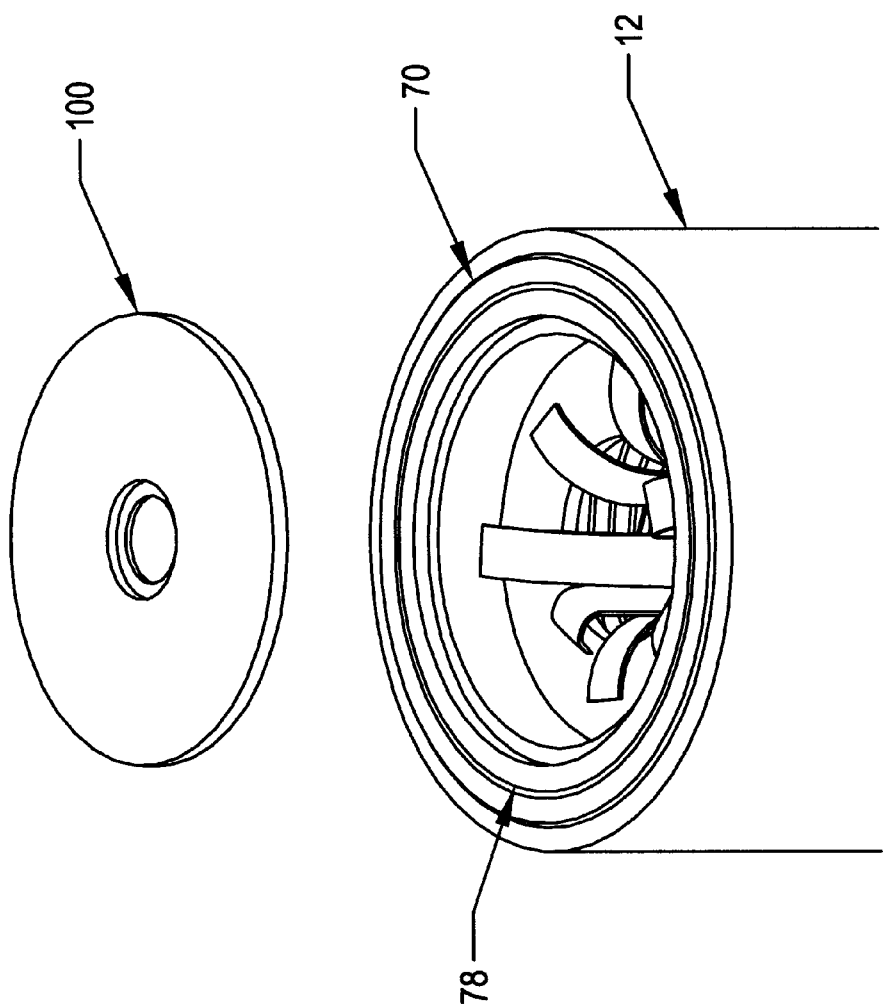
FIG. 5 is an isometric view showing the upper end of the battery similar to FIG. 4 but with the end cap displaced.

Attention is now directed to FIG. 4 which illustrates the upper end of the battery case 12 in greater detail. Note that the peripheral wall 14 defines an inwardly extending annular shoulder 68 proximate to its upper end. Prior to inserting the electrode assembly 22 into the case 12, a dielectric ring, e.g., PFA, 70 is inserted into the interior case volume from the peripheral wall open lower end 18. The dielectric ring 70 defines a shoulder 72 which is seated flush against the annular shoulder 68. More specifically, the dielectric ring 70 is dimensioned so that its outer diameter 74 is press-fit against the inner diameter 76 at the upper end of the peripheral wall 14. The press-fit between the dielectric ring 70 and the inner surface of the peripheral wall 14 forms a seal preventing any leakage therepast.

After the dielectric ring 70 is installed at the upper end of the peripheral wall 14, a metal ring 78, e.g., nickel, is inserted from the open lower end 18 of the peripheral wall and concentrically seated against the dielectric ring 70. More particularly, the outer surface 80 of ring 78 is press fit and seals against the inner surface 81 of dielectric ring 70. More over, shoulder 82 of metal ring 78 seats against shoulder 84 of dielectric ring 70. Note that the metal ring 78 defines an inwardly extending flange 86 having an upper surface 88.

After the metal ring 78 and dielectric ring 70 have been installed at the upper end of the peripheral wall 14, the aforedescribed jelly roll assembly 22 is inserted into the case 12 from the open lower end 18. The upwardly extending negative tabs 50, 52 are formed to extend through a central opening 90 in annular flange 86. The negative tabs 50, 52 are then electrically secured, as by welding, to the ring surface 88.

The positive tabs 56, 58, etc. extend outwardly form the lower end 18 of case 12. The lower end 18 terminates at a bottom wall edge 94. The positive tabs 56, 58 etc. are folded over the edge 94 as depicted in FIG. 6. Thereafter, an end cap 96 is mounted on the edge 94, pinching the positive tabs therebetween. The end cap 96 is preferably aluminum and is welded to the bottom edge 94 thereby electrically connecting the positive tabs to the case peripheral wall 14. Protruding tab material is then trimmed to the end cap circumference. The end cap 96 is preferably formed with an annular shoulder 98 which bears against the bottom edge 94 of the wall 14 enabling the ready formation of a leak free seal by various techniques, such as laser welding.

After the lower open end of the casing 12 is sealed by the end cap 96, electrolyte can be inserted into the battery via the aforementioned central opening 90 in metal ring flange 86. A large end cap 100 defining an annular shoulder 102 is sealed against annular shoulder 104 on metal ring 78. The end cap 100 defines a central opening 106, which is then sealed by minor end cap 108.

From the foregoing, it should now be recognized that a battery construction has been described herein which minimizes the amount of wasted space within the battery case and insures that substantially the entire interior volume sealed with the case is available and can be used for accommodating an electrode assembly. Wasted interior space is minimized by directly connecting a plurality of first polarity tabs extending from the electrode assembly to a current collection ring adjacent the upper end of the case. A plurality of second polarity tabs is directly connected to a lower edge of the case thereby assuring that substantially the entire volume is available for accommodating the electrode assembly. This construction yields a high energy density output which is further enhanced by the utilization of multiple tabs which reduces the internal resistance of the battery.

While the invention has been described with reference to a specific preferred embodiment, it should be recognized that numerous modifications and variations will occur to those skilled in the art without departing from the spirit and scope of the invention defined by the appended claims.

What is claimed is:

1. A battery comprising:

a tubular case comprising an electrically conductive wall enclosing an interior volume, said case defining open first and second ends;

an electrode assembly comprising helically wound first and second electrode strips spaced by at least one separator strip, said first assembly including a first set of spaced tabs extending in a first direction from said first electrode strip and a second set of spaced tabs extending in a second direction from said second electrode strip;

means mounting said electrode assembly in said interior volume with said first set of tabs proximate to said case open first end and said second set of tabs proximate to said case open second end;

a dielectric member mounted in said interior volume close to said case first end;

an electrically conductive ring mounted on said dielectric member close to said case first end and electrically insulated from said case wall;

means electrically connecting said first set of tabs to said electrically conductive ring;

an electrically conductive first end cap; and wherein said first end cap is secured to said case wall first end proximate to said conductive ring to minimize empty interior volume therebetween.

2. The battery of claim 1 wherein said conductive ring defines an opening surrounded by a flat ring surface; and wherein said first set tabs extend from said electrode assembly through said opening and are electrically secured to said ring surface.

3. The battery of claim 2 further comprising an electrically conductive second end cap; and wherein said second end cap is secured to said case wall proximate to said second end so as to pinch and electrically connect said second set tabs between said case wall and said second end cap.

4. A battery comprising:

a tubular metal case having open first and second ends and defining an interior volume;

a dielectric member mounted in said case adjacent to said first open end;

a metal member supported by said dielectric member;

an electrode assembly comprising a first polarity electrode strip and a second polarity electrode strip helically wound together with a separator strip between adjacent layers;

a first plurality of first polarity metal tabs connected to spaced points along said first polarity electrode strip;

a second plurality of second polarity metal tabs connected to spaced points along said second polarity electrode strip;

said first and second pluralities of metal tabs extending in opposite directions from said electrode assembly; and wherein said electrode assembly is mounted in said interior volume with said first plurality of tabs electrically connected to said metal member and with said second plurality of tabs pinched between the case second end and a metal end cap secured to said case second end.

5. The battery of claim 4 wherein said dielectric member comprises an insulating ring configured for mounting in said interior volume in engagement with said metal case; and wherein said metal member comprises a conductive ring configured for mounting on said insulting ring close to said case first end; and a conductive end cap secured to said case first end close to said conductive ring to minimize empty interior volume space between said conductive end cap and said conductive ring.

6. The battery of claim 5 wherein said conductive ring defines an opening surrounded by a flat ring surface; and wherein said first set tabs extend from said electrode assembly through said opening and are electrically secured to said ring surface.

* * * * *